(12) United States Patent
Kanekawa

(10) Patent No.: US 11,016,461 B2
(45) Date of Patent: *May 25, 2021

(54) CONTROL SYSTEM AND METHOD FOR GENERATING CONTROL OUTPUT BY MANIPULATION INTERFACE

(71) Applicant: HITACHI, LTD., Tokyo (JP)

(72) Inventor: Nobuyasu Kanekawa, Tokyo (JP)

(73) Assignee: HITACHI, LTD., Tokyo (JP)

(*) Notice: Subject to any disclaimer, the term of this patent is extended or adjusted under 35 U.S.C. 154(b) by 90 days.

This patent is subject to a terminal disclaimer.

(21) Appl. No.: 16/470,874

(22) PCT Filed: Feb. 22, 2017

(86) PCT No.: PCT/JP2017/006462
§ 371 (c)(1),
(2) Date: Jun. 18, 2019

(87) PCT Pub. No.: WO2018/154639
PCT Pub. Date: Aug. 30, 2018

(65) Prior Publication Data
US 2020/0089180 A1    Mar. 19, 2020

(51) Int. Cl.
*G05B 19/042* (2006.01)
*G05B 9/02* (2006.01)
(Continued)

(52) U.S. Cl.
CPC .......... *G05B 19/0425* (2013.01); *G05B 9/02* (2013.01); *B60W 10/20* (2013.01); *B60W 30/09* (2013.01); *B62D 6/00* (2013.01)

(58) Field of Classification Search
CPC .............. G05B 19/0425; G05B 9/02; G05B 2219/2637; G05B 2219/45018;
(Continued)

(56) References Cited

U.S. PATENT DOCUMENTS 5,510,982 A * 4/1996 Ohnishi .............. F16H 61/0213
                                                            701/55
6,389,332 B1 * 5/2002 Hess ..................... G01C 21/26
                                                              701/1
(Continued)

FOREIGN PATENT DOCUMENTS

JP    2008-117082 A    5/2008
JP    2013-129328 A    7/2013
(Continued)

OTHER PUBLICATIONS

International Search Report dated May 30, 2017 for the PCT International Application No. PCT/JP2017/006462.

*Primary Examiner* — Ramesh B Patel
(74) *Attorney, Agent, or Firm* — Volpe Koenig

(57) ABSTRACT

A control system includes: an operation interface generates operation amount information and priority information on the basis of an operation amount; an automatic control unit generates an automatic control output based on a predetermined input; a safety verification unit verifies the safety of the automatic control output; and an output control unit produces a control output in accordance with the automatic control output or the operation amount information on the basis of the automatic control output, the operation amount information, the priority information, and the safety verification result from the safety verification unit. The control output is generated in accordance with the automatic control output, in accordance with the operation amount information only when the control output is verified as safe by the safety verification unit, or in accordance with the operation amount information regardless of whether the control output is verified as safe by the safety verification unit.

8 Claims, 11 Drawing Sheets

(51) Int. Cl.
*B60W 30/09* (2012.01)
*B62D 6/00* (2006.01)
*B60W 10/20* (2006.01)

(58) Field of Classification Search
CPC ... G05B 19/0428; B60W 30/09; B60W 10/20; B62D 6/00
See application file for complete search history.

(56) References Cited

U.S. PATENT DOCUMENTS

| | | |
|---|---|---|
| 10,710,632 B2* | 7/2020 | Sato .................. B62D 15/025 |
| 10,788,824 B2* | 9/2020 | Oniwa .................. B62D 6/00 |
| 2013/0245794 A1* | 9/2013 | Ishii .................. G05B 19/0425 |
| | | 700/79 |
| 2018/0259925 A1* | 9/2018 | Fujimura ............... B25J 9/1674 |
| 2020/0139988 A1* | 5/2020 | Kanekawa ........ B60W 50/0098 |

FOREIGN PATENT DOCUMENTS

| | | | |
|---|---|---|---|
| JP | 2016-159781 A | 5/2016 | |
| JP | 2016-132352 A | 7/2016 | |

* cited by examiner

CONTROL SYSTEM AND METHOD FOR GENERATING CONTROL OUTPUT BY MANIPULATION INTERFACE

This application is co-pending with U.S. patent application Ser. No. 16/608,646 filed on Oct. 25, 2019 which claims the benefit of 371 International Application PCT/JP2018/014914, filed on Apr. 9, 2018 which claims priority from Japanese Patent Application No. 2017-088602, filed on Apr. 27, 2017, the entire contents of which are incorporated herein by reference.

TECHNICAL FIELD

The present invention relates to a control system and a control method.

BACKGROUND ART

Since the full automation of control including automatic driving does not require manual manipulation, it is possible to reduce the probability of an accident caused by a human error and to improve the safety. On the other hand, in the event of an emergency, by enabling human override (manipulation intervention), it is possible to secure the safety in the event of a failure of a control device or an unexpected situation. As a technology that enables a human override in an emergency, PTL 1 is known.

In PTL 1, it is disclosed that "The present invention includes the steps of: detecting obstacles existing on the periphery of a vehicle; generating a plurality of target loci that allow the vehicle to avoid the detected obstacles; detecting, as a driver's intention, an avoiding direction of the vehicle relative to an obstacle, which is determined by manipulation of the driver; selecting a target locus of the avoiding direction, on which the driver's intention is reflected, from the plurality of generated target loci; and executing locus control for avoiding the obstacle on the basis of the selected target locus."

In PTL 2, it is disclosed that "Provided is a traveling control plan evaluation device which can accurately evaluate the safety of a traveling control plan of an automatically operated vehicle. The traveling control plan evaluation device 10 for evaluating the safety of the traveling control plan of the automatically operated vehicle includes: a behavior prediction means 16a for predicting a behavior which is likely to be exhibited by a nearby vehicle which is present near the automatically operated vehicle at a given time point; a location prediction means 16b for predicting the location of the nearby vehicle after the given time point based on the location of the nearby vehicle at the given time point and the behavior predicted by the behavior prediction means 16a; and an evaluation means 20 for evaluating the safety of the traveling control plan on the basis of the location of the nearby vehicle predicated by the location prediction means 16b and the location of the automatically operated vehicle according to the traveling control plan."

In PTL 3, it is disclosed that "To provide an autonomous driving vehicle system that reduces annoyance to be perceived by a driver when the driver of a vehicle in an autonomous driving state tentatively intervenes in driving. A system includes an acquisition unit that acquires a manipulation value of a driver's driving manipulation or a continuity count dependent on a duration of the driving manipulation, and a switching unit that switches an autonomous driving state, a collaborative driving state, and a manual driving state depending on the manipulation value or the continuity count. While the autonomous driving state is established, when the manipulation value becomes larger than or equal to an intervention threshold value and falls below an initiation threshold value or when the continuity count becomes larger than or equal to a first threshold value and falls below a second threshold value, the switching unit switches the autonomous driving state to the collaborative driving state. While the collaborative driving state is established, when the manipulation value falls below the intervention threshold value or the continuity count falls below the first threshold value, the switching unit switches the collaborative driving state to the autonomous driving state, and when the manipulation value becomes larger than or equal to the initiation threshold value or the continuity count becomes larger than or equal to the second threshold value, the switching unit switches the collaborative driving state to the manual driving state."

CITATION LIST

Patent Literature

PTL 1: JP 2013-129328 A
PTL 2: JP 2008-117082 A
PTL 3: JP 2016-132352 A

SUMMARY OF INVENTION

Technical Problem

In the related art, it is only possible to select either an automatic manipulation state or an override state, which is inconvenient.

The present invention has been devised in view of the above problems, and an object of the present invention is to provide a control system and control method capable of generating control output on the basis of manipulation value information of a manipulation interface unit within a range in which the safety is verified.

Solution to Problem

In order to solve the above disadvantage, a control system according to one aspect of the present invention generates control output, the control system including: a manipulation interface unit which generates manipulation value information and priority information on the basis of a manipulation value, which is a physical quantity; an automatic control unit which generates automatic control output on the basis of predetermined input; a safety verification unit which verifies safety of the automatic control output; and an output control unit which outputs control output in accordance with either the automatic control output or the manipulation value information on the basis of the automatic control output, the manipulation value information and the priority information, and the safety verification result by the safety verification unit, in which, on the basis of the priority information, the output control unit generates the control output in accordance with the automatic control output, generates the control output in accordance with the manipulation value information within a range in which the safety is verified by the safety verification unit, or generates the control output in accordance with the manipulation value information regardless of the safety verification result by the safety verification unit.

Advantageous Effects of Invention

According to the present invention, on the basis of priority information, the output control unit is capable of executing any one of generating control output in accordance with automatic control output, generating the control output on the basis of the manipulation value information within a range in which the safety verification unit verifies the safety, and generating the control output in accordance with the manipulation value information regardless of the safety verification result by the safety verification unit, and thus the usability is improved.

DESCRIPTION OF EMBODIMENTS

Figure 1:
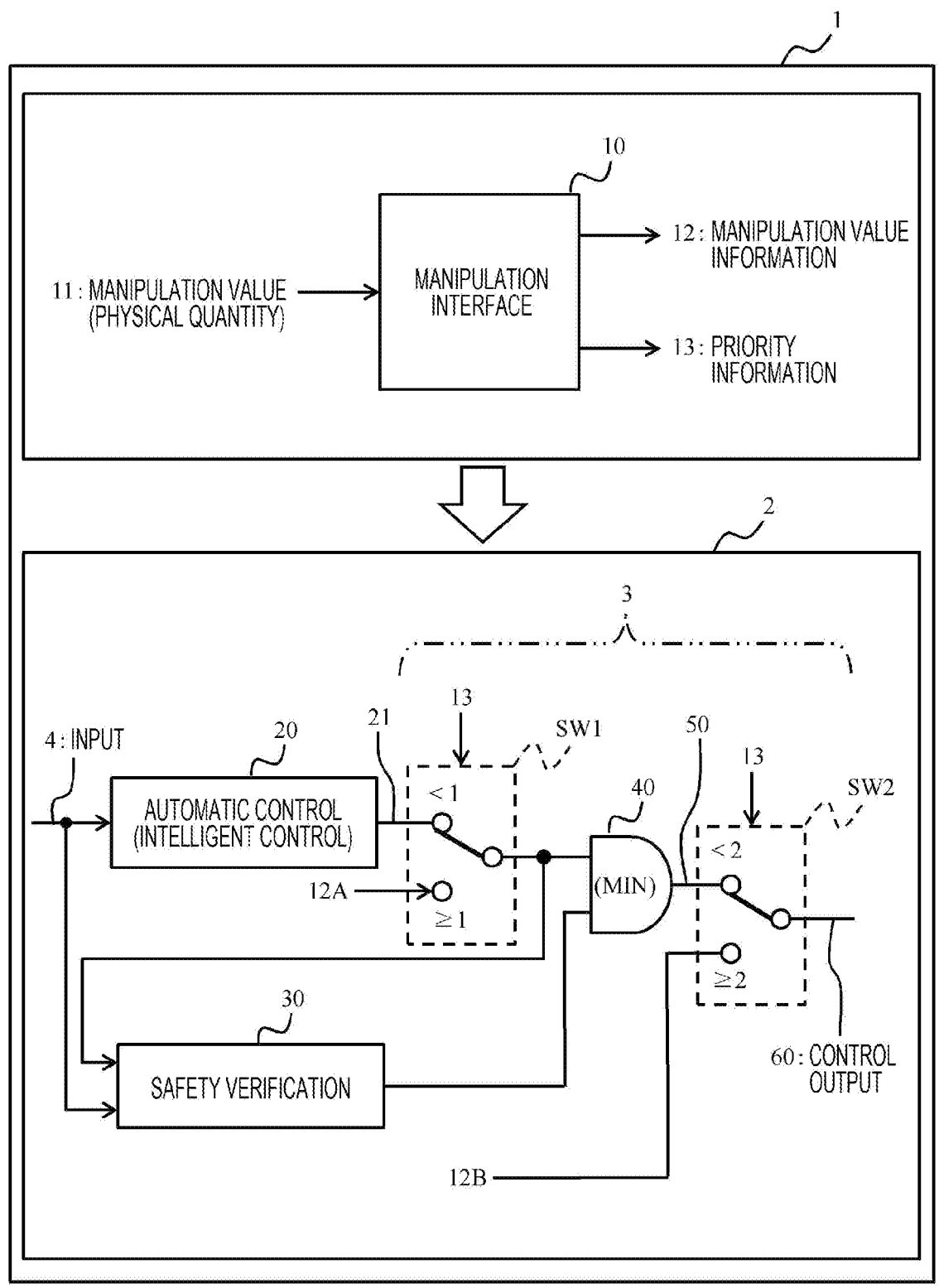
FIG. 1 is an overall configuration diagram of a control system.

Hereinafter, embodiments of the present invention will be described on the basis of the drawings. In the present embodiment, as will be described later, an interface (hereinafter referred to as manipulation interface) 10 for accepting an override related to the manipulation has a function to convert a physical quantity of the manipulation value into manipulation value information 12 and a function to convert the physical quantity 11 of the manipulation value into priority information 13 as an attribute attached to the manipulation value information 12. Hereinafter, the physical quantity of manipulation value is referred to as the "manipulation value as the physical quantity," "manipulation value (physical quantity)," or "manipulation value" in some cases.

The present embodiment includes an automatic control unit 20 which generates automatic control output and a safety verification unit 30 which verifies the safety of the automatic control output. In the present embodiment, when priority information is lower than a predetermined threshold value, control is performed under the restriction by the safety verification unit 30, and when the priority information is higher than the predetermined threshold value, control is performed without being restricted by the safety verification unit 30.

According to the present embodiment, three operation modes can be automatically switched by user manipulation that is input depending on the situation. Since it is possible to switch among three operation modes of an operation mode that operates based on automatic control output, an operation mode that allows override operation (human intervention manipulation) under the restriction by the safety verification unit, and an operation mode that allows override operation without being restricted by the safety verification unit, the usability for users is improved. According to the present embodiment, it is possible to obtain appropriate control output corresponding to the situation even when the override operation in an emergency and the safety determination by the safety verification unit are different.

First Embodiment

A first embodiment will be described with reference to FIG. 1. FIG. 1 is a block diagram illustrating an overall configuration of a control system 1. The control system 1 includes a manipulation interface unit 10 illustrated on the upper side of FIG. 1 and a control device 2 illustrated on the lower side of FIG. 1.

A manipulation value (physical quantity) 11 is input to the manipulation interface 10 by a user (not illustrated). The manipulation interface unit 10 obtains manipulation value information 12 and priority information as information from the input manipulation value (physical quantity) 11.

The control device 2 is connected to the manipulation interface unit 10 in a wired or wireless manner and generates control output 60 for controlling a control target (not illustrated) on the basis of the manipulation value information 12, the priority information 13, and the like that are input from the manipulation interface unit 10. The manipulation interface unit 10 and the control device 2 may be separately formed and connected by a cable, a communication network, or the like. Alternatively, the manipulation interface unit 10 and the control device 2 may be integrally formed.

The control device 2 includes, for example, an automatic control unit 20, a safety verification unit 30, an AND gate 40, and a plurality of switches SW1 and SW2. Here, the switches SW1 and SW2 and the AND gate 40 form an output control unit 3.

The automatic control unit 20 generates automatic control output 21 for automatically controlling the control target on the basis of predetermined input 4 and outputs the automatic control output 21. A first switch SW1, which is an example of a "first selection unit," selects and outputs one of a plurality of pieces of input in accordance with the priority information 13. The automatic control output 21 and manipulation value information 12A are input to the first switch SW1. The manipulation value information 12A is manipulation value information input from the manipulation interface unit 10 to the first switch SW1. The manipulation value information 12B is input from the manipulation interface unit 10 to a second switch SW2.

The first switch SW1 compares the priority information 13 input from the manipulation interface unit 10 and a predetermined first value "1." The first switch SW1 selects the automatic control output 21 and outputs the automatic control output 21 to the AND gate 40 when the priority information 13 is smaller than "1." Contrarily, when the priority information 13 is larger than or equal to "1," the first switch SW1 outputs the manipulation value information 12A from the manipulation interface unit 10 to the AND gate 40.

The safety verification unit 30 verifies the safety of the output from the first switch SW1 from the input 4 to the automatic control unit 20 and the output from the first switch SW1 (either the automatic control output 21 or the manipulation value information 12A). To verify the safety of the output is to determine whether the control target operates safely when the output from the first switch SW1 is input to the control target (not illustrated).

When the safety verification unit 30 can confirm that the output from the first switch SW1 is safe, the safety verification unit 30 outputs a signal to the AND gate 40 to allow the AND gate 40 to output the input from the first switch SW1. Contrarily, when the safety verification unit 30 cannot confirm the safety of the output from the first switch SW1, the safety verification unit 30 causes the AND gate 40 to shut off or to restrict the output from the first switch SW1.

As described above, the AND gate 40 which is an example of the "safety confirmation unit" is a circuit which outputs the input from the first switch SW1 as it is, or blocks or restricts the input from the first switch SW1 depending on the control signal input from the safety verification unit 30. Instead of the AND gate 40, a minimum value selecting circuit which selects the minimum value may be used as the safety confirmation unit. The AND gate 40 outputs the input from the first switch SW1 as safety limited output 50 within a range in which the safety is verified by the safety verification unit 30.

The safety limited output 50 from the AND gate 40 and the manipulation value information 12B are input to the second switch SW2 which is an example of a "second selection unit." The second switch SW2 compares the priority information 13 from the manipulation interface unit 10 and a predetermined second value "2." When the priority information 13 is smaller than "2," the second switch SW2 selects the safety limited output 50 from the AND gate 40, and outputs the safety limited output 50 to the control target as the control output 60. Contrarily, when the priority information 13 is larger than or equal to "2," the second switch SW2 selects the manipulation value information 12B and outputs the manipulation value information 12B to the control target as the control output 60.

In the present embodiment configured as described above, (1) when the priority information 13 is smaller than "1," the automatic control output 21 is selected by the first switch SW1 and is output as the control output 60 under monitoring by the safety verification unit 30. (2) Moreover, when the priority information 13 is larger than or equal to "1" and less than "2," the first switch SW1 selects the manipulation value information 12A, which is output as the control output 60 under the restriction by the safety verification unit 30. (3) Moreover, when the priority information 13 is larger than or equal to "2," the second switch SW2 selects the manipulation value information 12B and outputs the manipulation value information 12B as the control output 60. The control output 60 is identical with the manipulation value information 12B and is not restricted by the safety verification unit 30.

According to the present embodiment, since the safety of the automatic control output 21 from the automatic control unit 20 is monitored by the safety verification unit 30, it is possible to ensure the safe operation of the control target. According to the present embodiment, since the strength of the request for the override by a user is detected as the priority information 13, an appropriate override can be implemented depending on the emergency situation. That is, in the present embodiment, two types of overrides including an override restricted by the safety verification unit 30 ("1" priority information 13 <"2") and the override not restricted by the safety verification unit 30 ("2"≤priority information 13) can be automatically selected depending on the situation, and thus the usability of users is improved.

Note that, by introducing artificial intelligence such as deep learning or machine learning as the automatic control unit 20, it is expected to implement control performance beyond human knowledge. However, since it goes beyond human knowledge, it is desirable to improve accountability (explainable property) regarding the safety. Therefore, by adding the safety verification unit 30 in the present embodiment, it is possible to ensure the safety even in advanced control by artificial intelligence beyond human knowledge.

Second Embodiment

Figure 2:
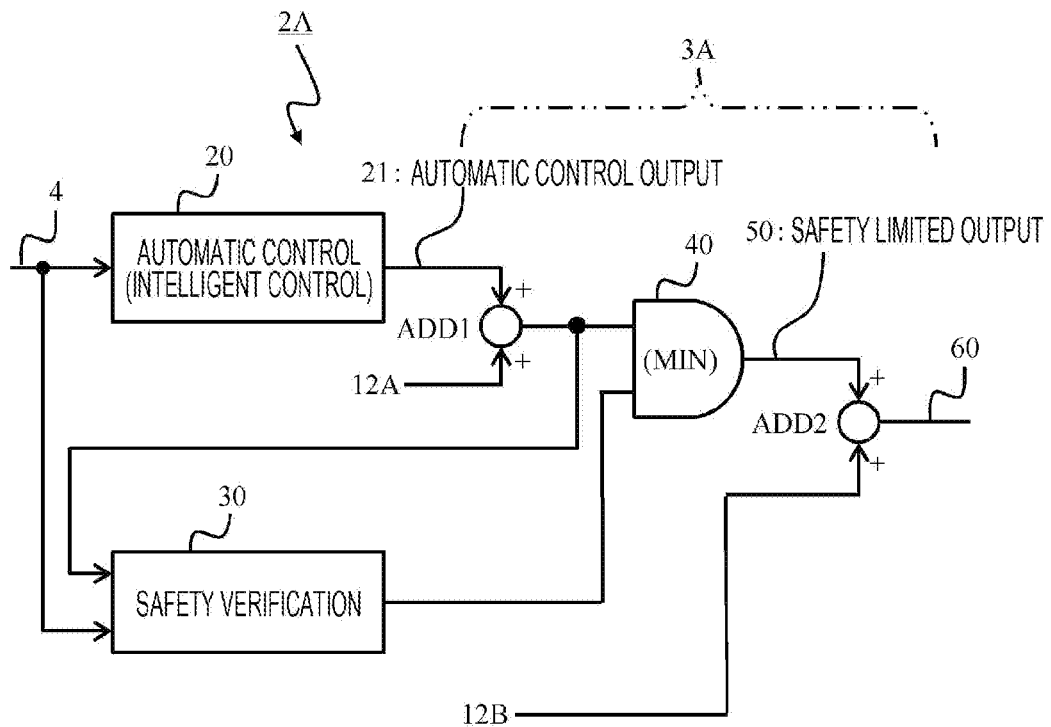
FIG. 2 is a block diagram illustrating a configuration of a control device according to a second embodiment.

A second embodiment will be described with reference to FIG. 2. Each of the following embodiments including the present embodiment corresponds to a variation of the first embodiment, and therefore, differences from the first embodiment will be mainly described. The present embodiment suppresses occurrence of a stepwise change upon switching the output.

In the switches SW1 and SW2 described in FIG. 1, there is a difference between a plurality of pieces of input, and thus switching from one input to other input results in a stepwise change in the output. For example, when the first switch SW1 switches from the automatic control output 21 to the manipulation value information 12A depending on a change in the priority information 13, a stepwise change occurs in the output from the first switch SW1.

Therefore, as illustrated in Equation 1 below, by gradually switching over from one input ina to other input inb with time $0 < t < T$, it is possible to suppress occurrence of a stepwise change in the output out.

$$\text{out} = (\text{in}a(T-t)\text{in}a + t^*\text{in}b)/T \qquad \text{(Equation 1)}$$

Figure 3:
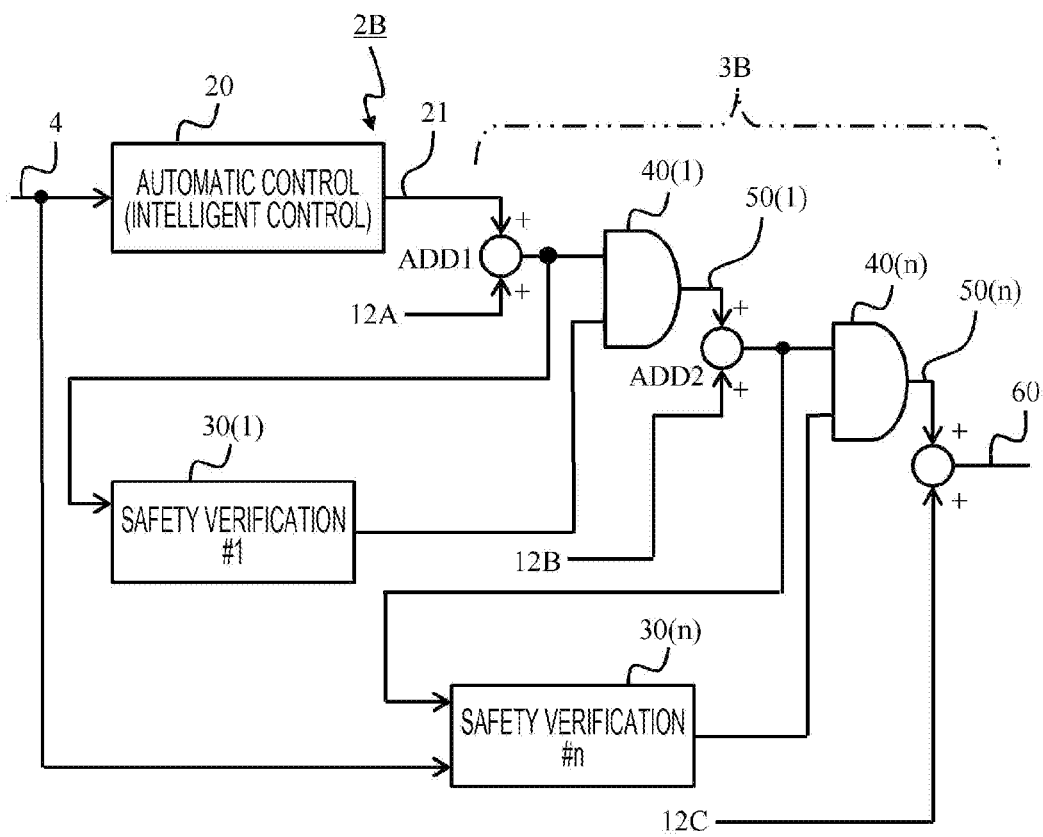
FIG. 3 is a block diagram illustrating a configuration of a control device according to a third embodiment.

In FIG. 3, another example for suppressing a stepwise change is illustrated. In a control device 2A illustrated in FIG. 3, adders ADD1 and ADD2 are used in an output control unit 3A. That is, in FIG. 3, the adders ADD1 and ADD2 are used in place of the switches SW1 and SW2.

The first adder ADD1 adds an automatic control output and a manipulation value information 12A, and outputs the result to an AND gate 40. The second adder ADD2 generates control output 60 by adding safety limited output 50 from the AND gate 40 and manipulation value information 12B.

By adding the manipulation value information 12A to the automatic control output 21, it is possible to make the change in the output from the first adder ADD1 smoother than in the case of the first switch SW1. Similarly, by adding the manipulation value information 12B to the safety limited output 50, it is possible to make the change in the output from the second adder ADD2 smoother than in the case of the second switch SW2. As a result, in the present embodiment, it is possible to obtain the control output 60 with less stepwise changes and to control the control target more smoothly as compared to the first embodiment.

Third Embodiment

A third embodiment will be described with reference to FIG. 3. In a control device 2B of the present embodiment, an output control unit 3B includes a plurality of safety verification units 30(1) to 30(n) and a plurality of AND gates 40(1) to 40(n).

Output 50(1) to 50(n) of the AND gates 40(1) to 40(n) are controlled by respective output of the safety verification units 30(1) to 30(n), respectively. Moreover, a control output 60 is generated by adding manipulation value information 12C to safety limited output 50(n) from the AND gate 40(n) in the final stage.

In a case where the same determination logic is implemented in each of the safety verification units 30(1) to 30(n), the safety verification units 30(1) to 30(n) function as a redundant system. Therefore, in this case, the safety of the control output 60 can be ensured even when any one or more safety verification units fail.

Meanwhile, different determination logics can be implemented in each of the safety verification units 30(1) to 30(n). In this case, the design of the safety verification unit can be diversified, and as a result, it is possible to prevent omission of detection dependent on a determination logic. For example, a determination logic by artificial intelligence such as deep learning is implemented in at least one of the safety verification units 30(1) to 30(n), and a determination logic based on a rule is further implemented in at least one of the safety verification units 30(1) to 30(n). As a result, it is possible to achieve both abnormality (dangerous event) detection beyond human knowledge by artificial intelligence and accountability (explainable property) based on a certain rule.

Furthermore, the output control unit 3B may be configured in consideration of the probability of false negatives (events of erroneous determination as being abnormal (dangerous) despite being normal) of the safety verification units 30(1) to 30(n). In a case where a safety verification unit with the highest false negative probability is regarded as the safety verification unit 30(1), and a safety verification unit with next highest false negative probability is regarded as the safety verification units 30(2), 30(3), . . . , a safety verification unit with a higher false negative probability is bypassed when the priority information is lower, and a safety verification unit with a lower false negative probability is bypassed when the priority information is higher.

The present embodiment configured in the above manner also exhibits similar effects to those of the first and second embodiments. Moreover, in the present embodiment, since a plurality of stages of the safety verification units 30(1) to 30(n) and the AND gates 40(1) to 40(n) are included, usability and reliability can be further improved.

Fourth Embodiment

Figure 4:
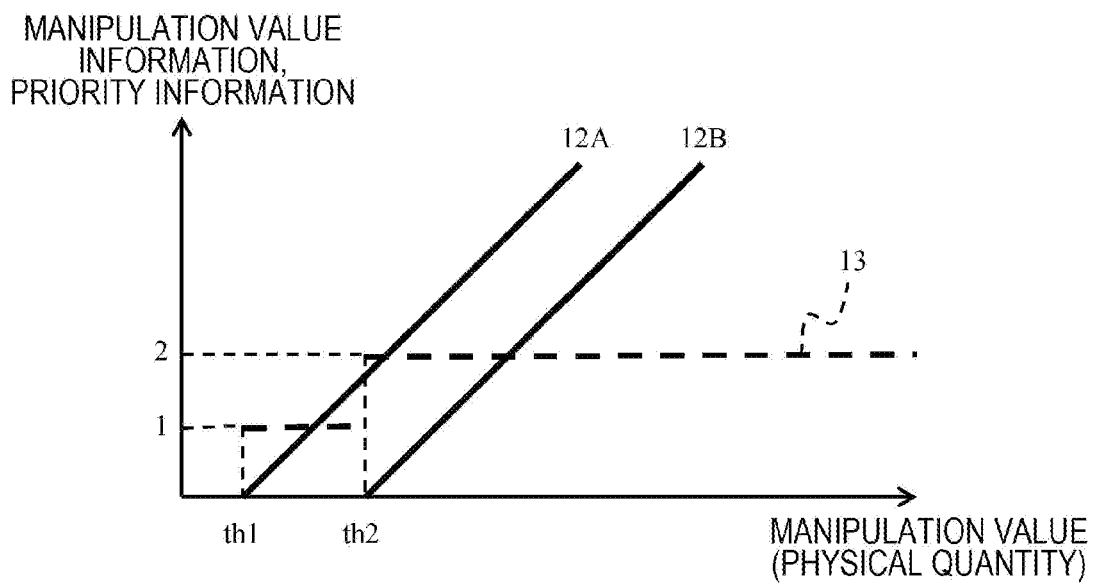
FIG. 4 is a graph illustrating the relationship between a manipulation value and manipulation value information and priority information according to a fourth embodiment.
Figure 7:
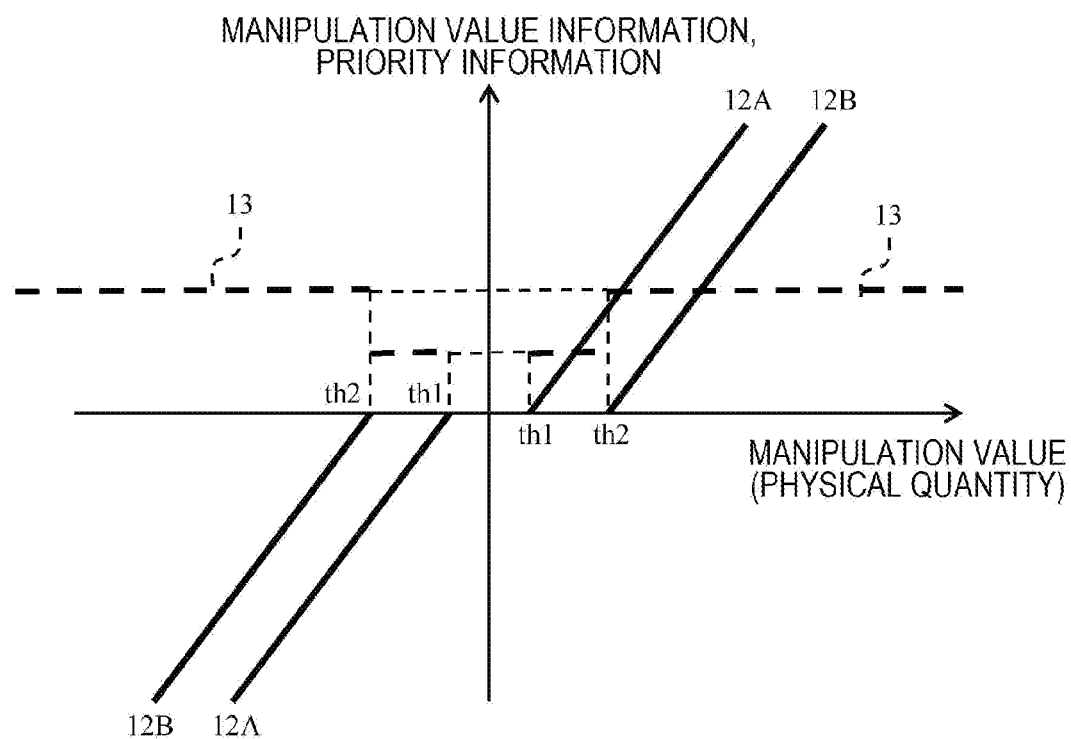
FIG. 7 is a graph illustrating the relationship between the manipulation value and the manipulation value information and the priority information in a case where the mechanism of a manipulation interface unit is different.
Figure 8:
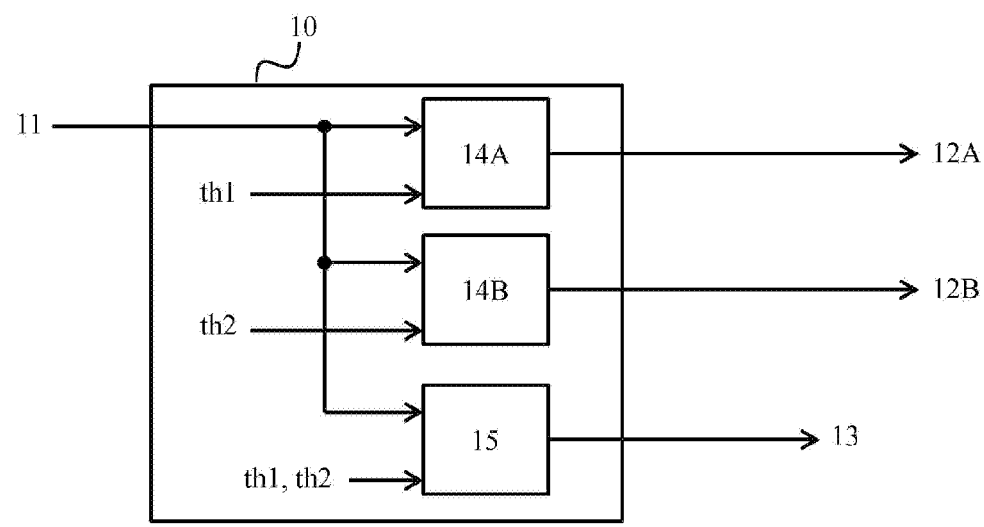
FIG. 8 is a block diagram of the manipulation interface unit.

A fourth embodiment will be described with reference to FIGS. 4 to 9. FIGS. 4 and 8 illustrate examples in which the manipulation interface 10 generates the priority information 13 in accordance the size of the manipulation value (physical quantity) 11.

FIG. 4 illustrates the relationship among the manipulation value 11, the manipulation value information 12A and 12B, and the priority information 13. When the manipulation value 11 exceeds predetermined threshold values th1 and th2, manipulation value information 12A and 12B having values proportional to the value of the manipulation value 11 are generated. Moreover, when the manipulation value 11 exceeds the threshold value th1, a first value "1" is given as the priority information 13, and when the manipulation value 11 exceeds the threshold value th2, a second value "2" is given.

Figure 5:
FIG. 5 is a graph illustrating the relationship between the manipulation value and the reaction force.

FIG. 5 illustrates the relationship between the manipulation value 11 and the reaction force. As illustrated in FIG. 5, a step is provided in the reaction force at the points where the manipulation value 11 becomes equal to the threshold values th1 and th2. This allows a user to recognize by sense of touch the magnitude correlation between the manipulation value 11 input to the manipulation interface unit 10 and the threshold values th1 and th2, which means, the priority information 13.

Figure 6:
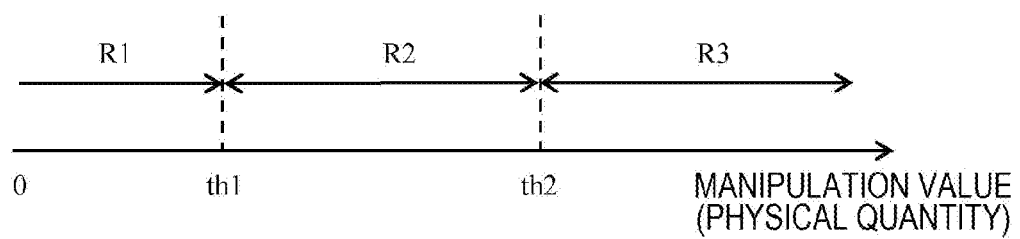
FIG. 6 is an explanatory diagram illustrating the relationship between the magnitude of manipulation value (priority information) and operation modes of control output.

FIG. 6 is an explanatory diagram illustrating the relationship between the magnitude of manipulation value 11 (priority information) and operation modes of control output. In the case where the manipulation value 11 is less than the threshold value th1 (R1), the automatic control output 21 becomes the control output 60 under the restriction by the safety verification unit 30. In the case where the user applies a manipulation value 11, which is greater than or equal to the threshold value th1 and less than the threshold value th2, to the manipulation interface 10 (R2), the user can override within a range permitted by the safety verification unit 30. In the case where the user applies a manipulation value 11 which is greater than or equal to the threshold value th2 to the manipulation interface unit 10 (R3), the user can override irrespective of the safety verification unit 30.

FIG. 4 is an example of a case where the manipulation value 11 changes in one direction (for example, manipulation of a brake pedal or an accelerator pedal). FIG. 7 is an example of a case where the manipulation value 11 changes in both directions with the neutral point in the center (for example, manipulation of a steering wheel).

Also in the case illustrated in FIG. 7, the manipulation value information 12A and 12B and the priority information 13 can be generated by comparing the absolute value of the manipulation value 11 with the threshold values th1 and th2 like in FIG. 4. As for the reaction force as well, like in the case of FIG. 5, a step can be provided in the reaction force at points where the entire value of the manipulation value 11 is equal to the threshold values th1 and th2. This allows the user to recognize by sense of touch the magnitude correlation between the manipulation value 11 applied to the manipulation interface unit 10 and the threshold values th1 and th2 and the priority information 13 to be generated.

FIG. 8 is a configuration example of the manipulation interface unit 10. The manipulation interface unit 10 includes, for example, conversion units 14A and 14B and a priority generation unit 15.

The first conversion unit 14A is a circuit that converts the manipulation value 11 into the manipulation value information 12A to be input to the first switch SW1 or the first adder ADD1. The first conversion unit 14A generates the manipulation value information 12A corresponding to the manipulation value 11 by comparing the manipulation value 11 with the first threshold value th1.

Likewise, the second conversion unit 14B is a circuit that converts the manipulation value 11 into the manipulation value information 12B to be input to the second switch SW2 or the second adder ADD2. The second conversion unit 14B generates the manipulation value information 12B corresponding to the manipulation value 11 by comparing the manipulation value 11 with the second threshold value th2. Although two conversion units 14A and 14B are illustrated in FIG. 8, without limited to this, the manipulation interface unit 10 can incorporate three or more conversion units.

The priority generation unit 15 is a circuit that generates the priority information 13 from the manipulation value 11. The priority generation unit 15 generates the priority information 13 corresponding to the value of the manipulation value 11 by comparing the manipulation value 11 with the threshold values th1 and th2.

Figure 9:
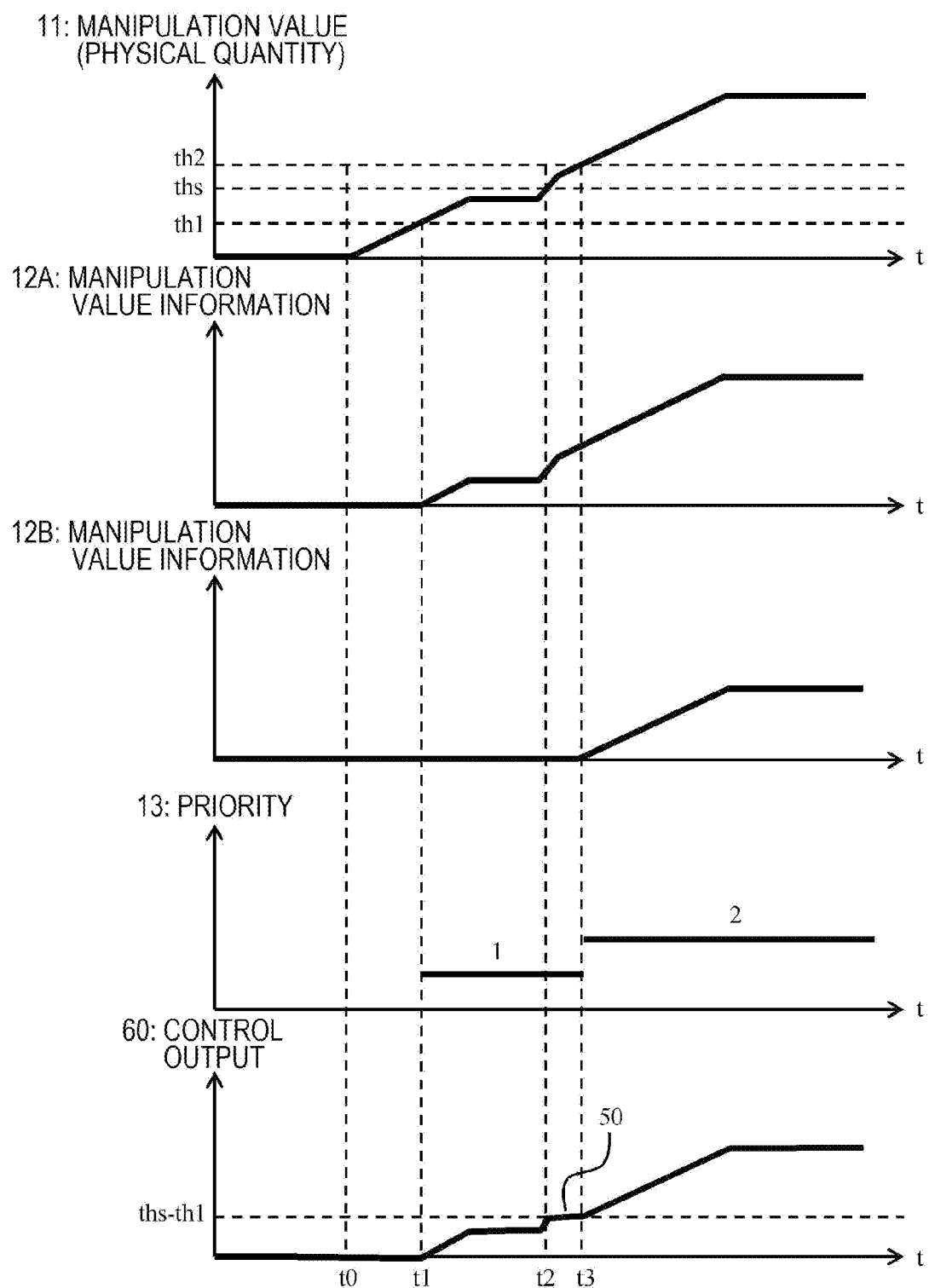
FIG. 9 is a graph illustrating temporal changes in the relationship between the manipulation value, the manipulation value information, the priority information, and the control output.

FIG. 9 is a graph illustrating exemplary temporal changes in the manipulation value 11, the manipulation value information 12A and 12B, the priority information 13, and the control output 60.

In FIG. 9, it is assumed that the manipulation value started to be input after time t0 and reaches the threshold value th1 after time t1. When the manipulation value 11 becomes greater than or equal to the threshold value th1, the manipulation value information 12A becomes larger than "0," and the priority information 13 becomes "1." As a result, the manipulation value information 12A is output as the control output 60.

Thereafter, when the manipulation value 11 further increases and exceeds the safety limited output threshold value ths at time t2, the control output 60 is limited to the safety limited output 50 until time t3 when the physical quantity 11 becomes larger than or equal to the threshold value th2.

It is assumed that the physical quantity 11 further increases and reaches the threshold value th2 at time t3. When the manipulation value 11 becomes larger than or equal to the threshold value th2, the priority information 13 changes from "1" to "2." Therefore, after time t3, a value obtained by adding the manipulation value information 12B to the safety limited output 50 is output as the control output 60.

The safety limited output threshold value ths is determined such that a relative speed (Vs−Vo) with respect to an obstacle at a distance 1 from the obstacle with a target speed Vs at the time of the automatic driving becomes less than a predetermined speed. For example, under the condition of stopping when (Vs−Vo) is zero at a constant acceleration (deceleration) a, Equations 2 and 3 are given.

$$(Vs-Vo) = \text{SQRT}(2a1) \quad \text{(Equation 2)}$$

$$Vs = \text{SQRT}(2a1) + Vo \quad \text{(Equation 3)}$$

Where, Vs: upper limit of target speed of host vehicle
Vo: speed of obstacle

In a case where the control system 1 is applied to aircraft control, a stalling speed can be used for the lower limit of the safety limited output threshold value ths, and the operational maximum speed can be used for the upper limit.

According to the embodiment configured in this manner, as described above, it is possible to switch between operation modes by user manipulation corresponding to the situation, between (1) an operation mode that operates based on automatic control, (2) an operation mode that allows override operation under the restriction by the safety verification unit 30, and (3) an operation mode that allows override operation without being restricted by the safety verification unit 30.

Fifth Embodiment

Figure 10:
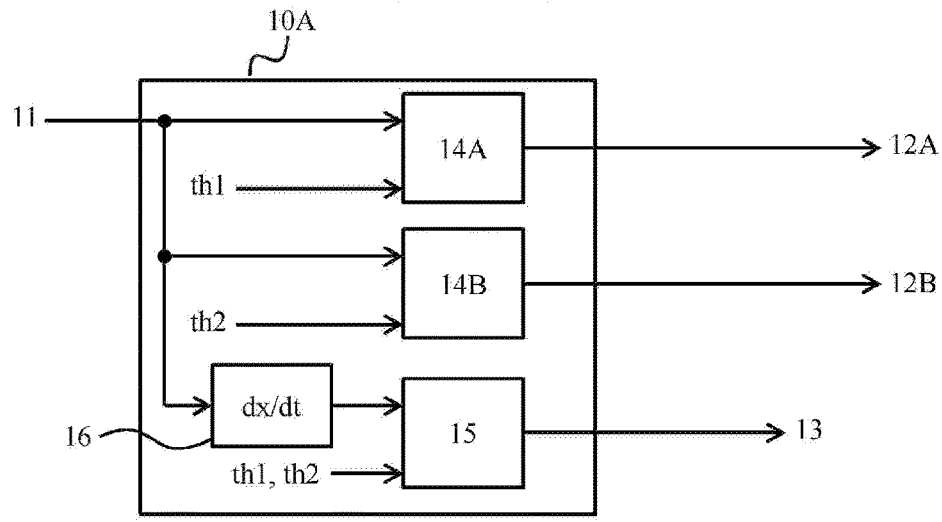
FIG. 10 is a block diagram of a manipulation interface unit according to a fifth embodiment.

A fifth embodiment will be described with reference to FIG. 10. FIG. 10 is a configuration diagram of a manipulation interface unit 10A of the present embodiment. The manipulation interface unit 10A of the present embodiment generates priority information 13 on the basis of a derivative of the manipulation value 11.

The manipulation interface unit 10A includes a differentiating circuit 16 in addition to conversion units 14A and 14B and a priority generation unit 15. The priority generation unit 15 is input with a value obtained by differentiating the manipulation value 11 by the differentiating circuit 16. The priority generation unit 15 generates the priority information 13 by comparing the derivative of the manipulation value 11 with the threshold values th1 and th2.

The present embodiment configured in the above manner also exhibits similar effects to those of the first embodiment. Furthermore, according to the present embodiment, since the priority information 13 is generated from a derivative of the manipulation value 11, it is possible to detect temporal changes of the manipulation value. Therefore, in the present embodiment, the urgency of manipulation can be speculated from the derivative of the manipulation value 11, and the value of the priority information 13 can be set higher as the manipulation is more urgent.

Sixth Embodiment

Figure 11:
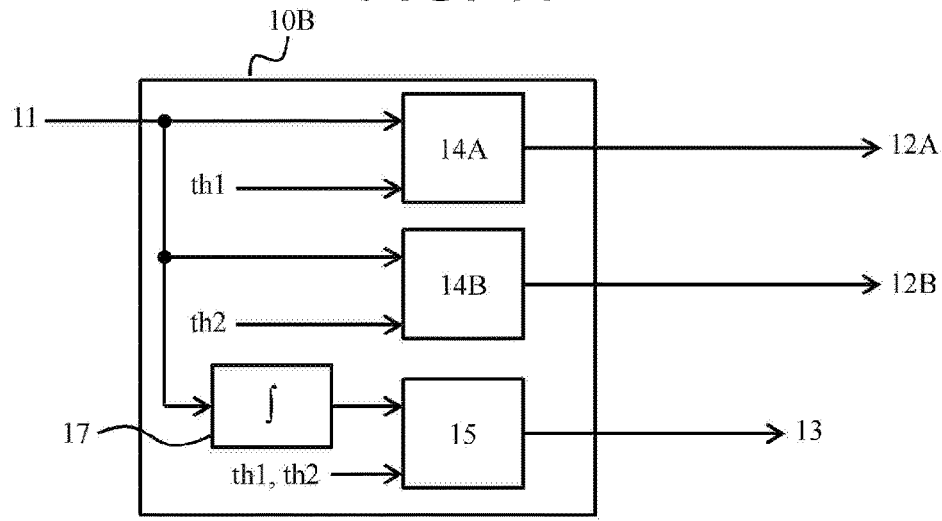
FIG. 11 is a block diagram of a manipulation interface unit according to a sixth embodiment.

A sixth embodiment will be described with reference to FIG. 11. FIG. 11 is a configuration diagram of the manipulation interface unit 10B of the present embodiment. The manipulation interface unit 10B of the present embodiment generates priority information 13 on the basis of an integral value of a manipulation value 11. In the present embodiment, an integrating circuit 17 is provided in place of the differentiating circuit 16 described in FIG. 10.

The integrating circuit 17 inputs an integral value of the manipulation value 11 to the priority generation unit 15. The priority generation unit 15 generates priority information 13 by comparing the integral value of the manipulation value 11 with threshold values th1 and th2.

The present embodiment configured in the above manner also exhibits similar effects to those of the first embodiment. Furthermore, according to the present embodiment, since the priority information 13 is generated from the integral value of the manipulation value 11, the size and duration of the manipulation can be detected. Therefore, in the present embodiment, the strength of the user's intention for the manipulation can be speculated from the integral value of the manipulation value 11, and the value of the priority information 13 can be set higher as the manipulation is accompanied by a stronger intention to perform the manipulation.

Seventh Embodiment

Figure 12:
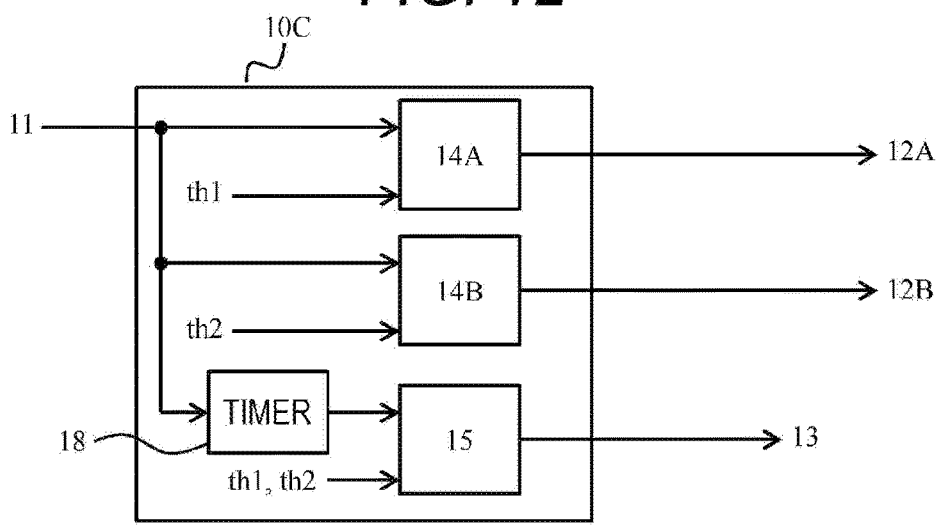
FIG. 12 is a block diagram of a manipulation interface unit according to a seventh embodiment.

A seventh embodiment will be described with reference to FIG. 12. FIG. 12 is a configuration diagram of a manipulation interface unit 10C of the present embodiment. The manipulation interface unit 10C of the present embodiment generates priority information 13 in accordance with the duration of the manipulation value 11. In the present embodiment, a timer 18 is included in place of the integrating circuit 17 described in FIG. 11.

The timer 18 detects the duration of the manipulation value 11 and inputs the duration to a priority generation unit 15. The priority generation unit 15 generates the priority information 13 by comparing the duration of the manipulation value 11 with the threshold values th1 and th2.

The present embodiment configured in the above manner also exhibits similar effects to those of the first embodiment. Furthermore, in the present embodiment, since the certainty of the user's intention can be speculated from the duration of the manipulation value 11, the value of the priority information 13 can be set higher as the manipulation is accompanied by greater certainty.

Eighth Embodiment

Figure 13:
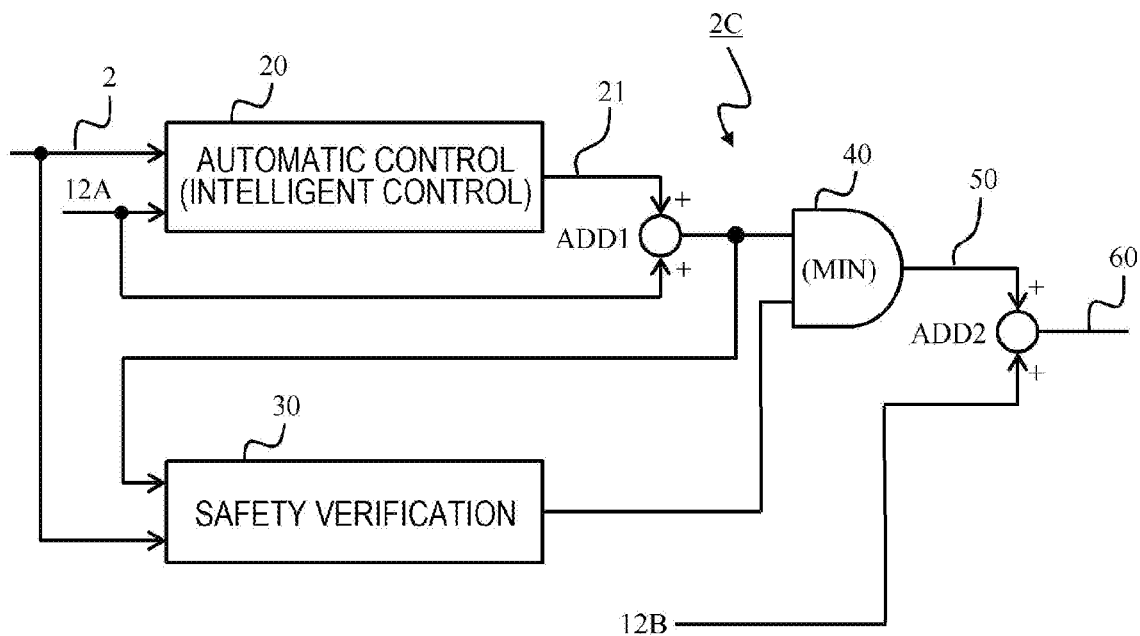
FIG. 13 is a block diagram of a manipulation interface unit according to an eighth embodiment.
Figure 14:
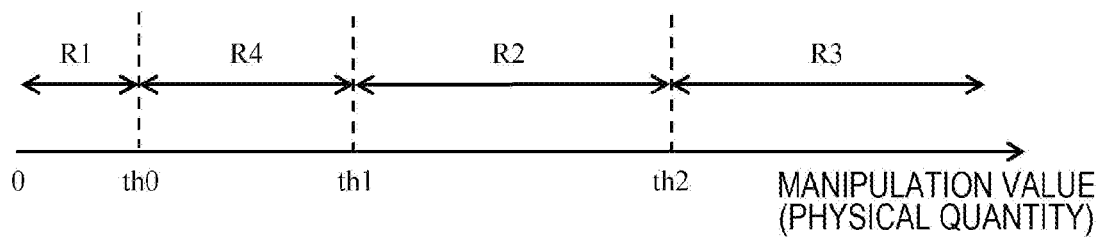
FIG. 14 is an explanatory diagram illustrating the relationship between the magnitude of manipulation value (priority information) and operation modes of control output.

An eighth embodiment will be described with reference to FIGS. 13 and 14. FIG. 13 illustrates a configuration example of a control device 2C according to the present embodiment. FIG. 14 is an explanatory diagram illustrating the relationship between the magnitude of the manipulation value (priority information) and operation modes of control output.

In an automatic control unit 20 of the present embodiment, in the case where the input manipulation value information 12A is larger than or equal to a predetermined threshold value th0 and smaller than the threshold value th1 (R4), a target locus in a direction in which the intention is reflected by the manipulation value information 12A input to the automatic control unit 20 is selected.

Furthermore, like in the example illustrated in FIG. 7, in the present embodiment a user can override within a range permitted by a safety verification unit 30 by adding a manipulation value 11 larger than or equal to the threshold value th1 to the manipulation interface unit 10 (R2). In the case where the user applies a manipulation value 11 which is greater than or equal to the threshold value th2 to the manipulation interface unit 10 (R3), the user can perform override operation irrespective of the safety verification unit 30.

According to the present embodiment configured as described above, it is possible to implement an operation mode (R1) which operates on the basis of the automatic control output 21, an operation mode (R4) which operates on the basis of the automatic control output 21 and operates by selecting a target locus in a direction reflecting the user's intention, that operates by selecting, a mode (R2) that allows an override within a range in which the safety is verified, and a mode (R3) which enables override operation irrespective of the safety verification.

Ninth Embodiment

Figure 15:
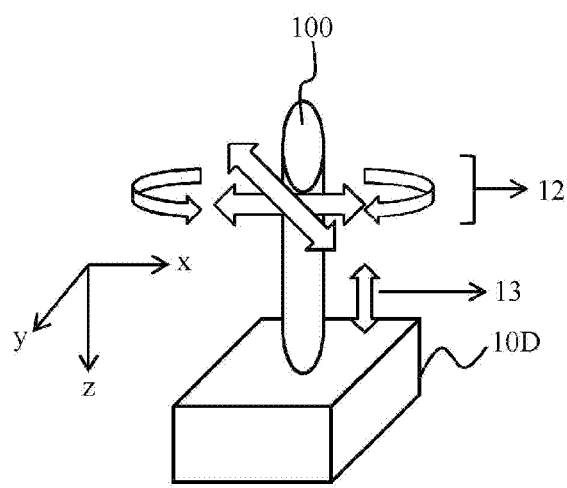
FIG. 15 is an explanatory diagram of a manipulation interface unit according to a ninth embodiment.

A ninth embodiment will be described with reference to FIG. 15. In the present embodiment, the manipulation freedom of a manipulation interface unit 10D is enhanced, and priority information 13 is generated with the manipulation freedom independent of the manipulation freedom assigned to the original manipulation value 11.

In the manipulation interface unit 10D of the present embodiment, the manipulation on the x-y plane is regarded as the original manipulation direction. That is, a user can input the manipulation value 11 by, for example, tilting a manipulation lever 100 in the x direction or y direction or turning it clockwise or counterclockwise around the rotation axis. Moreover, the user can generate the priority information 13 by pushing or pulling out the manipulation lever 100 in the z direction independent of the manipulation direction.

The present embodiment configured in the above manner also exhibits similar effects to those of the first embodiment. Furthermore, according to the manipulation interface unit 10D of the present embodiment, it is possible to generate the priority information 13 by predetermined manipulation independent of the normal manipulation instead of calculating the priority information 13 from the magnitude of the manipulation value 11. Therefore, the user's intention of manipulation can be clearly input to the control device 2.

Tenth Embodiment

Figure 16:
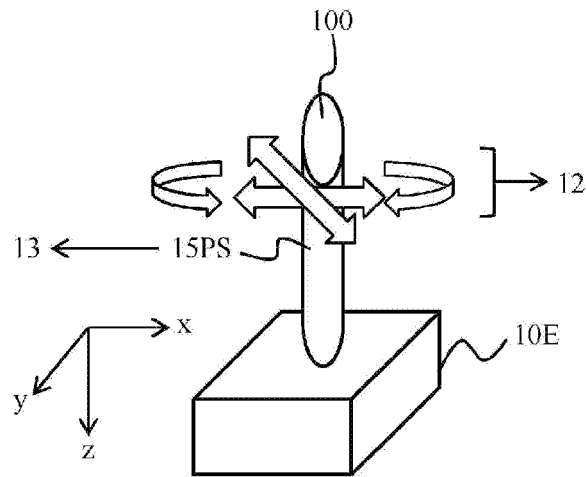
FIG. 16 is an explanatory diagram of a manipulation interface unit according to a tenth embodiment.

A tenth embodiment will be described with reference to FIG. 16. FIG. 16 is a configuration example of a manipulation interface unit 10E of the present embodiment. In the present embodiment, the operation on the x-y plane is regarded as a manipulation direction for generating a manipulation value 11. In the present embodiment, a pressure sensor 15PS independent of the manipulation direction is included in a manipulation lever 100. The pressure when a user grips the manipulation lever 100 is detected by the pressure sensor 15PS. The pressure detected by the pressure sensor 15PS (grip strength for gripping the manipulation lever 100) is converted into priority information 13 by a priority generation unit 15.

The present embodiment configured in the above manner also exhibits similar effects to those of the first embodiment. Furthermore, according to the manipulation interface unit 10E of the present embodiment, the user can input the urgency and importance of the manipulation to a control device 2 by firmly holding the manipulation lever 100.

Eleventh Embodiment

Figure 17:
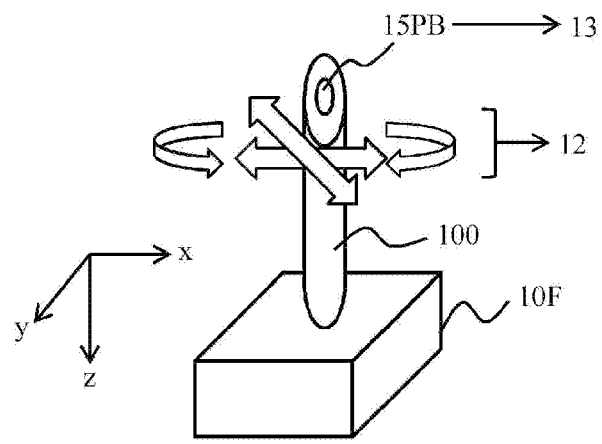
FIG. 17 is an explanatory diagram of a manipulation interface unit according to an eleventh embodiment.

An eleventh embodiment will be described with reference to FIG. 17. FIG. 17 is a configuration example of a manipulation interface unit 1OF of the present embodiment. In the present embodiment, the operation on the x-y plane is regarded as a manipulation direction for generating a manipulation value 11. Furthermore, in the present embodiment, a push button switch 15PB is provided on the upper part or a side part of a manipulation lever 100. When a user desires the override operation, it is only required to push the push button switch 15PB. Configuring the push button switch 15PB as a switch that can be pressed in a plurality of steps allows the value of priority information 13 to vary depending on the amount the user presses.

The present embodiment configured in the above manner also exhibits similar effects to those of the first embodiment. Furthermore, according to the present embodiment, the user can instruct a request for the override operation to the control device 2 by manipulating the push button switch 15PB.

Note that the priority information 13 may be generated by combining some of the push-in or pull-out manipulation of the manipulation lever 100, the pressure for gripping the manipulation lever 100, the manipulation of the push button provided on the manipulation lever 100, and the magnitude correlation between the manipulation value 11 and the threshold values th1 and th2.

Twelfth Embodiment

Figure 18:
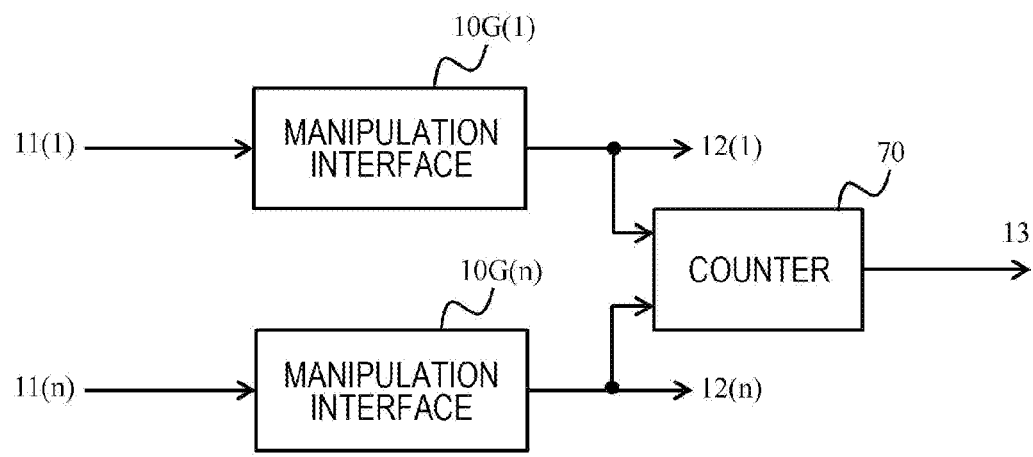
FIG. 18 is an explanatory diagram of a manipulation interface unit according to a twelfth embodiment.

A twelfth embodiment will be described with reference to FIG. 18. FIG. 18 is a configuration example of a manipulation interface unit 10G according to the present embodiment. In the present embodiment, a plurality of manipulation interface units 10G(1) to 10G(n) are included, and manipulation values 11 to the manipulation interface units 10G(1) to 10G(n) are totaled by a counter 70 to generate the priority information 13. Therefore, as more users operate the manipulation interface unit 10G in the same direction, the total value of the counter 70 becomes larger, and as a result, the priority information 13 is set to a higher value.

The present embodiment configured in the above manner also exhibits similar effects to those of the first embodiment. Furthermore, in the present embodiment, when a plurality of users manipulate, the operation mode can be determined by majority.

Thirteenth Embodiment

A thirteenth embodiment will be described with reference to FIGS. 19 to 24. In the present embodiment, a case where a control system is applied to an automatic driving system of a vehicle will be described.

Figure 19:
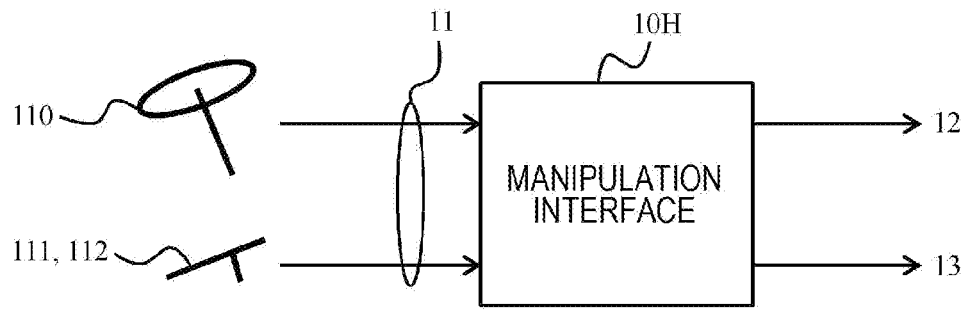
FIG. 19 is an explanatory diagram of a thirteenth embodiment in which a manipulation interface unit is applied to an automatic driving system of a vehicle.

FIG. 19 illustrates an example in which a manipulation interface unit 10H is applied to an automatic driving system. As manipulation values 11, a steering angle or steering torque 110, an accelerator pedal angle 111, and a brake pedal angle 112 are input to the manipulation interface unit 10H.

Figure 20:
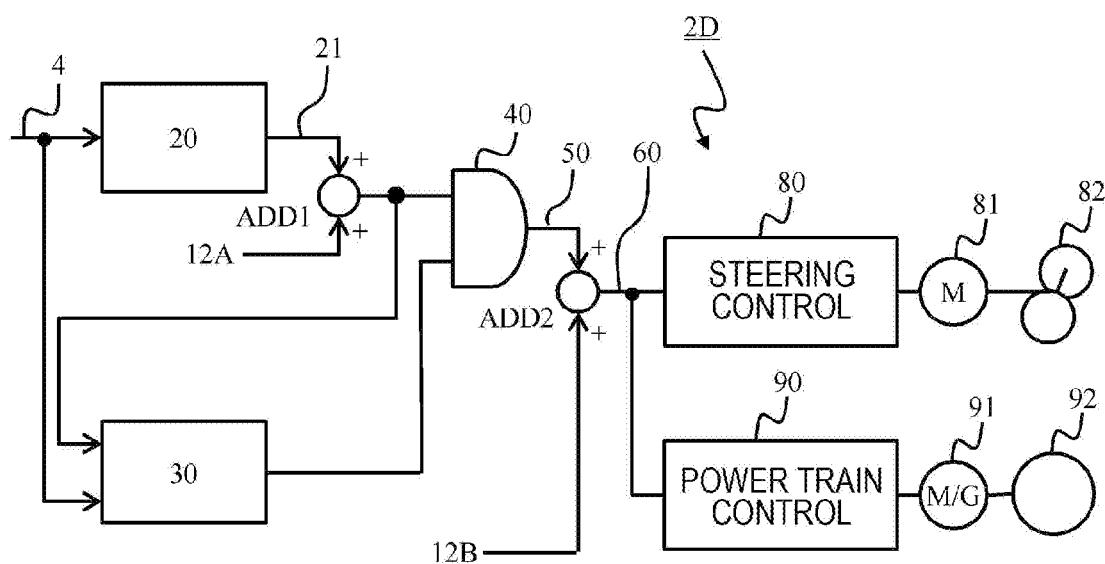
FIG. 20 is an explanatory diagram of a case where a control device is applied to an automatic driving system of a vehicle.

FIG. 20 illustrates an example in which a control device 2D of the present embodiment is applied to an automatic driving system. Control output 60 output from a control system 2D is input to a steering control unit 80 and a power train control unit 90.

In an automatic control mode which is dependent on the automatic control output 21, the steering control unit 80 controls a steering unit 82 by a motor 81 on the basis of the control output 60. Likewise in the automatic control mode, the power train control unit 90 controls the acceleration/deceleration of a driving wheel 92 by a motor generator 91 on the basis of the control output 60.

In an override mode, the steering control unit 80 controls the steering unit 82 by the motor 81 on the basis of the steering angle or the steering torque 110. Similarly, in the override mode, the power train control unit 90 controls the acceleration/deceleration of the driving wheel 92 by the motor generator 91 on the basis of the accelerator pedal angle 111 and the brake pedal angle 112. Note that, as described above, the override mode includes a mode subjected to the restriction by a safety verification unit 30 and a mode not subjected to the restriction by the safety verification unit 30.

Figure 21:
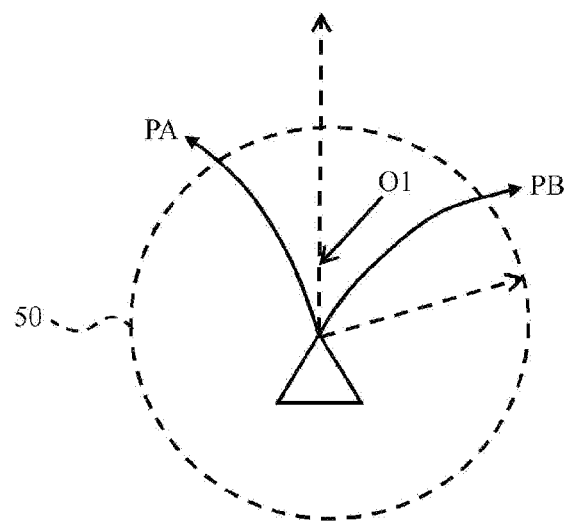
FIG. 21 is an explanatory diagram illustrating an example of avoiding an obstacle.

FIG. 21 is an explanatory diagram illustrating a situation in which when an obstacle O1 is approaching to a host vehicle (triangle) during automatic driving, avoidance is performed by the user's override manipulation to either a route PA or a route PB.

Figure 22:
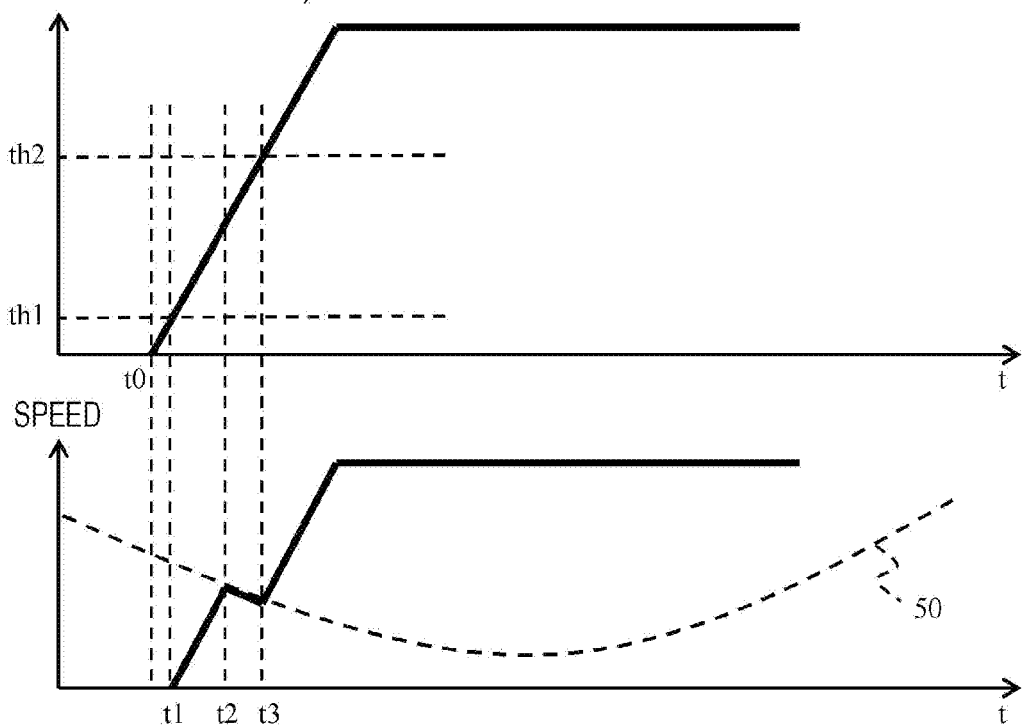
FIG. 22 is a graph illustrating temporal changes in the relationship between the manipulation value and the control output.

FIG. 22 is a graph illustrating the temporal changes of the manipulation value 11 (accelerator pedal angle 111) and the control output 60 (target speed) at the time of obstacle avoidance illustrated in FIG. 21.

When the manipulation value 11 starts to be input from time t0 and the manipulation value 11 reaches a first threshold value th1 at time t1, an override is started. As a result, the amount of the override manipulation is included in the control output 60 (target speed). Since the obstacle O1 is in the area of the safety limited output 50 of the host vehicle, the speed of the host vehicle is restricted by the safety limited output 50 (depending on the distance to the obstacle O) of the safety verification unit 30 after time t2. In this case, the host vehicle needs to avoid the obstacle O1 at a slow speed restricted by the safety limited output 50.

However, when the user steps on the accelerator pedal 111 at time t3 and the manipulation value 11 reaches a second threshold value th2, the restriction by the safety verification unit 30 is lifted. As a result, the host vehicle can avoid the obstacle O1 at a speed higher than a speed restricted by the safety limited output 50.

As described above, also in the case of application to the automatic driving system, the user can switch between the operation mode based on the automatic control output 21, a first override mode which allows the user's override manipulation within a range in which the safety is verified by the safety verification unit 30, and a second override mode in which the user can perform the override manipulation without being restricted by the safety verification unit 30, depending on the traffic situation and the like.

Figure 23:
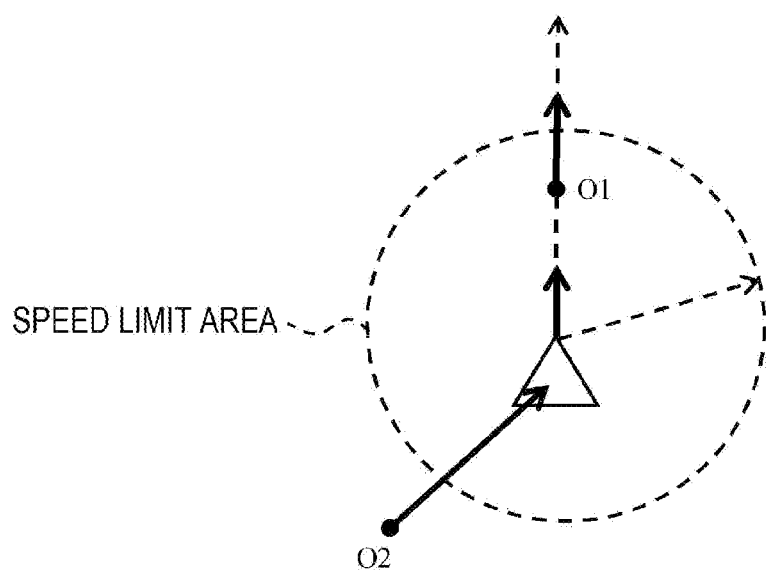
FIG. 23 is an explanatory diagram illustrating another example of avoiding an obstacle.
Figure 24:
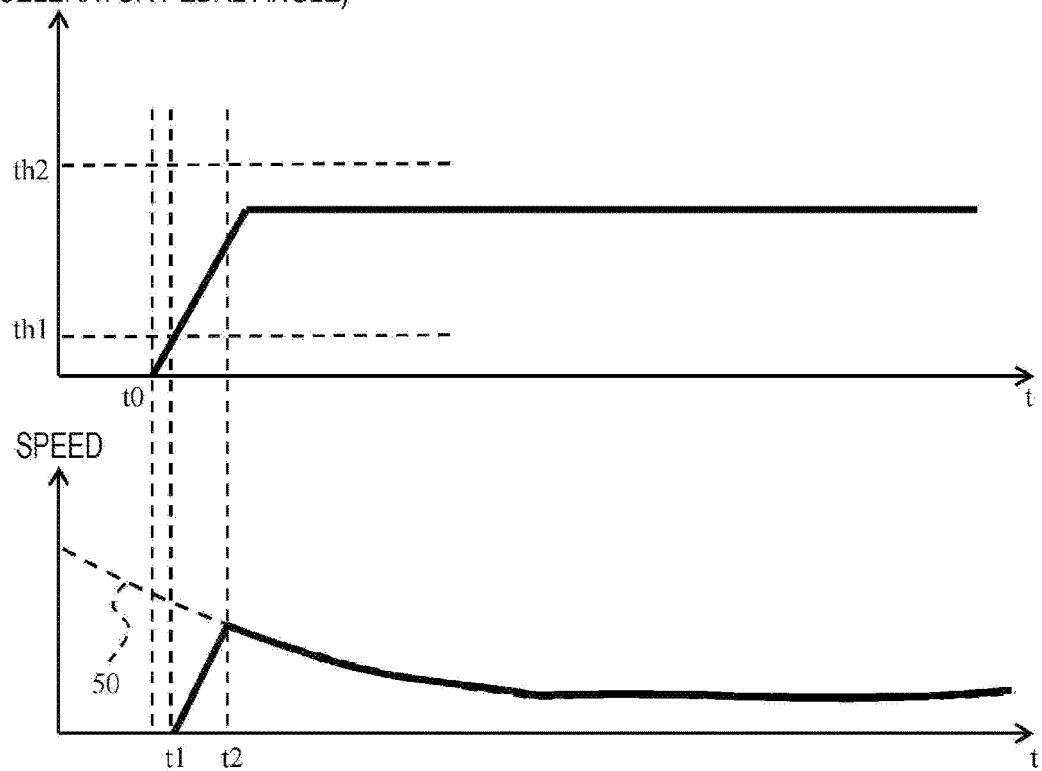
FIG. 24 is a graph illustrating temporal changes of the relationship between the manipulation value and the control output.

FIGS. 23 and 24 are explanatory diagrams illustrating a situation in which when there is an obstacle O1 ahead the host vehicle (triangle) during automatic driving and an obstacle O2 is approaching from behind the host vehicle, avoidance is performed by the user's override manipulation.

As illustrated in FIG. 24, when the manipulation value 11 (accelerator pedal angle 111) starts to be input from time t0 and the first threshold value th1 is reached at time t1, an override is started. As a result, the amount of the user's override manipulation is added to the control output 60 (target speed).

After time t1, the manipulation value 11 which is greater than or equal to the first threshold value th1 and smaller than the second threshold value th2 continues to be input. In this case, the speed of the host vehicle is restricted by the safety limited output 50 (dependent on the distance to the obstacle O1) of the safety verification unit 30. As a result, the host vehicle can reduce the distance to the obstacle O1 so as not to collide with the obstacle O1 ahead and can avoid an event of collision of the obstacle O2 behind into the host vehicle.

Fourteenth Embodiment

A fourteenth embodiment will be described with reference to FIG. 25. In the present embodiment, priority information 13 is generated using not only user manipulation but also biometric information such as the facial expression and the pulse of the user.

Figure 25:
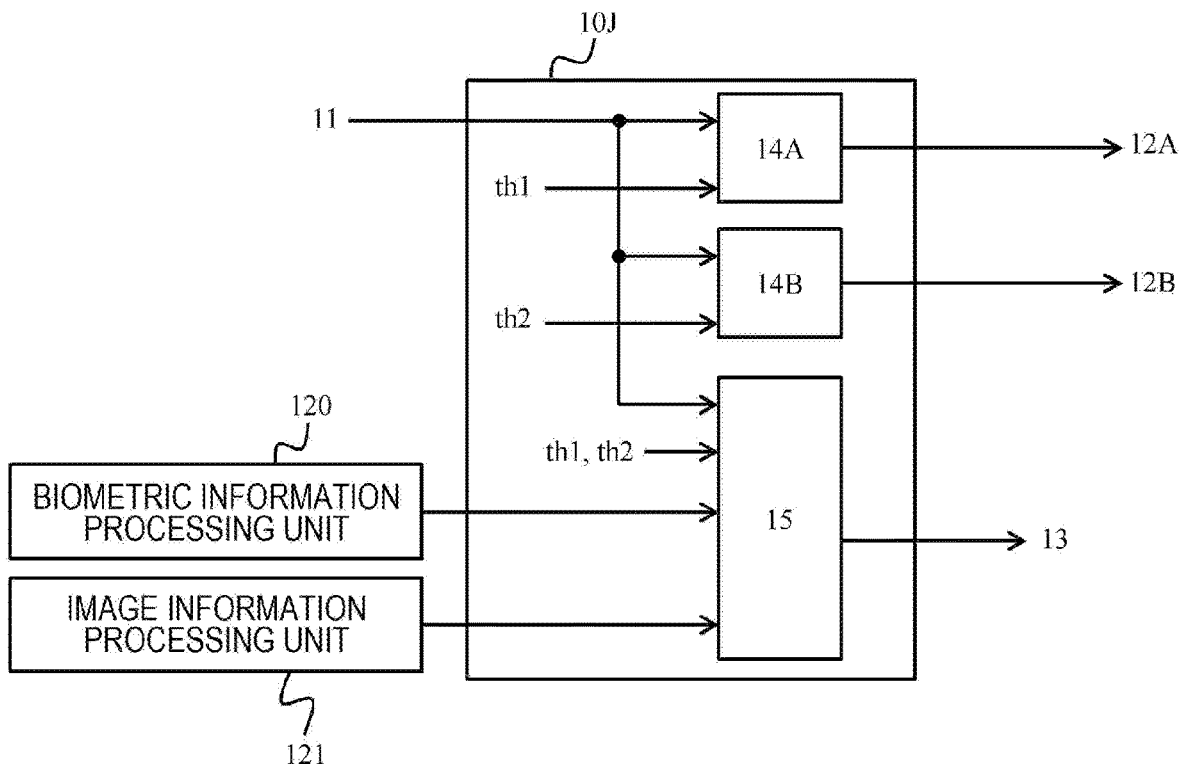
FIG. 25 is a block diagram of a manipulation interface unit according to a fourteenth embodiment.

FIG. 25 is a configuration example of a manipulation interface unit 10J of the present embodiment. A priority generation unit 15 of the manipulation interface unit 10J receives output from a biometric information processing unit 120 and an image information processing unit 121 in addition to a manipulation value 11 and threshold values th1 and th2.

For example, the biometric information processing unit 120 acquires biometric information such as the pulse, the blood pressure, the body temperature, and the brain waves of the user (driver) from sensors (not illustrated) and inputs results obtained by preprocessing the biometric information to the priority generation unit 15.

The image information processing unit 121 acquires, for example, facial expressions of the user (sleeping, awakened, nervous, etc.), motions of the user's head or the neck, etc. from a camera (not illustrated) and inputs a result obtained by processing the acquired image to the priority generation unit 15.

The priority generation unit 15 generates the priority information 13 on the basis of the magnitude relationship between the manipulation value 11 and the threshold values th1 and th2 and the biometric information and the image information of the user. Thus, for example, even when the manipulation value 11 does not reach the first threshold value th1, in a case where it is determined that the user cannot apply enough power for the manipulation due to a sudden illness or the like, it is possible to allow the user's override manipulation within a range in which the safety is ensured by the safety verification unit 30. Alternatively, even in a case where the user's manipulation value 11 has not reached the second threshold value th2, when an emergency is determined from the user's facial expressions or the heart rate, it is possible to allow the user's override manipulation without restriction by the safety verification unit 30.

Note that the present invention is not limited to the above-described embodiments. Those skilled in the art may make various additions or modifications within the scope of the present invention. For example, the embodiments can be combined as appropriate. Furthermore, the configurations described in the claims may be combined in other combinations than the explicitly described ones.

The above-described embodiments can also be expressed, for example, as follows. The following representations may be combined with the features described in the claims as desired.

First Representation: The control system, in which the manipulation interface unit has at least one or more threshold values, sets the priority information to a first value when a duration of the manipulation value exceeds a predetermined first threshold value, and sets the priority information to a second value when a duration of the manipulation value exceeds a second threshold value.

Second Representation: The control system, in which the manipulation interface unit converts a manipulation value input in a first direction out of movable directions of a manipulation lever into the manipulation value information and converts a manipulation value input in a second direction different from the first direction out of the movable directions into the priority information.

Third Representation: The control system, in which the manipulation interface unit includes a pressure sensor and converts a pressure input to the pressure sensor into the priority information.

Fourth Representation: The control system, in which the manipulation interface unit includes a push button and converts a pressing amount applied to the push button into the priority information.

Fifth Representation: The control system further including: an automatic control unit which generates automatic control output; and a safety verification unit which verifies safety of the automatic control output, in which the control output is output when the safety is verified by the safety verification unit, and when the safety is not verified by the safety verification unit, the control output is halted or is output within a range in which the safety is verified, and human intervention manipulation to the automatic control output is permitted within a range in which the safety is verified by the safety verification unit.

Sixth Representation: The control system according to the fifth representation, the control system having: a first operation mode which operates on the basis of the automatic control output; a second operation mode which permits human intervention manipulation within a range in which the safety is verified by the safety verification unit; and a third operation mode which permits the human intervention manipulation regardless of the safety verification by the safety verification unit, and the first to third operation modes can be switched therebetween.

Seventh Representation: The control system, in which the manipulation interface unit is configured as at least one of a steering force sensor, a steering angle sensor, an accelerator pedal angle sensor, and a brake pedal angle sensor.

Eighth Representation: The control system, in which the manipulation interface unit generates the priority information on the basis of biometric information and/or facial expression information of a user.

REFERENCE SIGNS LIST

1 control system
2, 2A, 2B, 2C, 2D control device
3, 3A, 3B output control unit
4 input
10, 10A, 10B, 10C, 10D, 10E, 10F, 10G, 10H, 10J manipulation interface unit
11 manipulation value (physical quantity)
12, 12A, 12B, 12C manipulation value information
13 priority information
20 automatic control unit
21 automatic control output
30 safety verification unit
40 AND gate (or minimum value selecting circuit)
50 safety limited output
60 control output

The invention claimed is:

1. A control system which generates a control output, the control system comprising:
   a manipulation interface unit which generates manipulation value information and priority information on the basis of a manipulation value, which is a physical quantity;
   an automatic control unit which generates automatic control output on the basis of predetermined input;
   a safety verification unit which verifies safety of the automatic control output; and
   an output control unit which outputs the control output in accordance with either the automatic control output or the manipulation value information on the basis of the automatic control output, the manipulation value information and the priority information, and the safety verification result by the safety verification unit,
   wherein, on the basis of the priority information, the output control unit generates
      the control output in accordance with the automatic control output,
      the control output in accordance with the manipulation value information within a range in which the safety is verified by the safety verification unit, or
      the control output in accordance with the manipulation value information regardless of the safety verification result by the safety verification unit.

2. The control system according to claim 1,
wherein a first case is classified on the basis of the priority information when the output control unit generates the control output on the basis of the automatic control output,
a second case is classified on the basis of the priority information when the output control unit generates the control output on the basis of the manipulation value information within a range in which the safety is verified by the safety verification unit, and
a third case is classified on the basis of the priority information when the output control unit generates the control output on the basis of the manipulation value information regardless of the safety verification result by the safety verification unit.

3. The control system according to claim 2,
wherein the first case is a case where the priority information is less than a predetermined first value,
the second case is a case where the priority information is greater than or equal to the predetermined first value and less than a predetermined second value, which is set to be larger than the predetermined first value, and
the third case is a case where the priority information is greater than or equal to the predetermined second value.

4. The control system according to claim 3,
wherein the output control unit comprises:
a first selection unit which selects the automatic control output when the priority information is less than the predetermined first value and selects the manipulation value information when the priority information is larger than or equal to the predetermined first value;
a safety confirmation unit which outputs output of the first selection unit within a range in which the safety of the output of the first selection unit is verified by the safety verification unit; and
a second selection unit which selects the output of the safety confirmation unit when the priority information is less than the predetermined second value, and selects and outputs the manipulation value information when the priority information is larger than or equal to the predetermined second value.

5. The control system according to claim 1,
wherein the output control unit comprises:
a first adder which adds the manipulation value information to the automatic control output and outputs the result on the basis of the priority information;
a safety confirmation unit which outputs the output of the first adder within a range in which the safety of the output of the first adder is verified by the safety verification unit; and
a second adder which adds the manipulation value information to the output of the first adder, the safety of which has been verified by the safety verification unit, and outputs the result on the basis of the priority information.

6. The control system according to claim 1,
wherein the manipulation interface unit sets the priority information to the predetermined first value when the manipulation value is greater than or equal to a predetermined first threshold value, and
the manipulation interface unit sets the priority information to the predetermined second value when the manipulation value is greater than or equal to a second threshold value which is larger than the predetermined first threshold value.

7. The control system according to claim 1,
wherein the manipulation interface unit sets the priority to the predetermined first value when a derivative or an integral value of the manipulation value is greater than or equal to a first threshold value, and
the manipulation interface unit sets the priority information to the predetermined second value when the derivative or the integral value of the manipulation value is greater than or equal to a second threshold value which is larger than the predetermined first threshold value.

8. A control method for generating a control output, the method comprising:
generating manipulation value information and priority information from a manipulation value which is a physical quantity;
generating automatic control output on the basis of predetermined input;
verifying safety of the generated automatic control output; and
on the basis of the priority information,
generating the control output on the basis of the automatic control output,
generating the control output on the basis of the manipulation value information within a range in which the safety is verified, or
generating the control output on the basis of the manipulation value information regardless of the safety verification result.

* * * * *